UNITED STATES PATENT OFFICE.

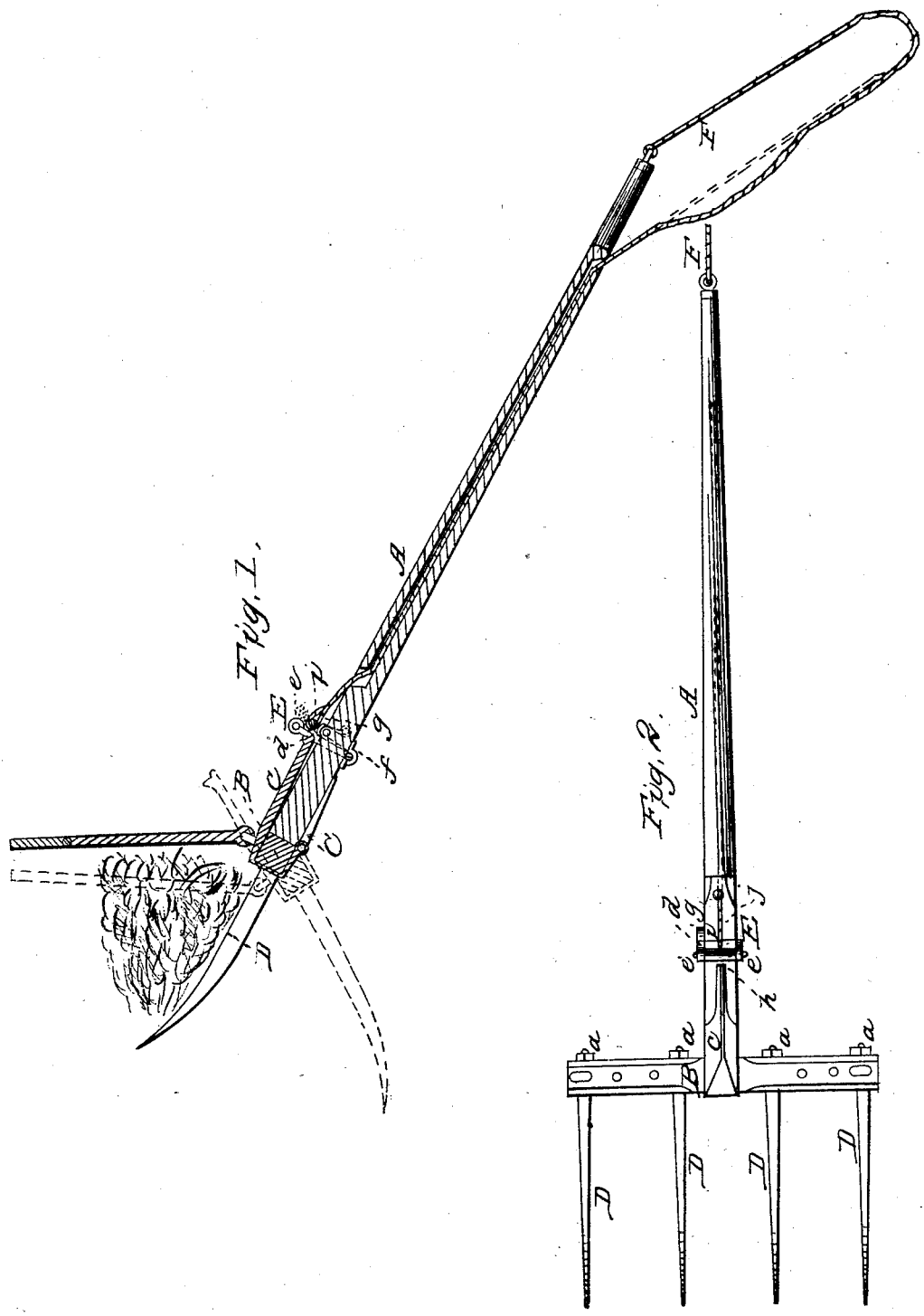

C. E. GLADDING AND J. N. GLADDING, OF TROY, PENNSYLVANIA, ASSIGNORS TO CHARLES E. GLADDING AFORESAID.

IMPROVEMENT IN FORKS FOR ELEVATING HAY.

Specification forming part of Letters Patent No. 20,241, dated May 11, 1858.

*To all whom it may concern:*

Be it known that we, CHARLES E. GLADDING and JOSEPH N. GLADDING, of Troy, in the county of Bradford and State of Pennsylvania, have invented a new and Improved Fork for Elevating Hay; and we do hereby declare that the following is a full, clear, and exact description of the same, reference being had to the annexed drawings, making a part of this specification, in which—

Figure 1 is a longitudinal section of our improvement, shown in a suspended state. Fig. 2 is a plan or top view of the same.

Similar letters of reference indicate corresponding parts in the two figures.

This invention relates to an improvement in that class of hay-forks in which a tackle is used for elevating the loaded fork.

To enable those skilled in the art to make and use our invention, we will proceed to describe its construction and operation.

A represents the handle of the fork, which is constructed of wood; and B is the fork-head, which is connected to the handle A by means of a metal hinge or joint, C. The fork-head B is placed directly at right angles with the handle A, and transversely it is about equal in dimension with the end of the handle A. The joint C is at the under side of the head and handle, and consequently the fork-head may turn downward, but is prevented from turning upward. To the head B metal tines D are attached. These tines may be of the usual form and size, and secured to the head in the ordinary way—viz., by having their inner ends pass through the head and nuts $a$ fitted on them, so that shoulders formed on them adjoining the screw-threads may be drawn snugly up against the outer side of the head.

To the hinge or joint C a metal strap, $c$, is attached, and this strap passes around the head B and extends a short distance over the end of handle A. The end of this strap catches under a plate, $d$, the upper end of which is hung in the upper part of a loop, E, as shown at $e\ e$, the plate $d$ being allowed to swing on the pivots $e$, which are fitted loosely in the upper end of the loop. The loop E is constructed of metal, and its lower end is fitted and allowed to turn freely in a bearing, $f$, attached to the under side of the handle A, and a spring, $g$, which is attached to one side of the handle, bears against the loop E, and has a tendency to keep the plate $d$ over the end of the strap $c$ and against a shoulder, $h$, thereon.

F is a rope, one end of which is attached to the end of the handle A, the opposite end passing through the handle and being attached to a bar, $i$, in the upper part of the loop E. Through the bar $i$ a set-screw, $j$, passes, said screw serving as an adjustable stop to the lower part of the plate $d$.

The implement is used as follows: The fork-head B is connected to a rope, G, which passes over a pulley or through a block suspended over the place where the hay is to be elevated, and the attendant below thrusts the tines D into the hay, and the attendant above elevates the loaded fork, the attendant below holding the rope F, so as to keep the handle A and the part of said rope connected with the handle nearly in line. When the loaded fork is sufficiently elevated and adjusted over the proper place the attendant below pulls the part of the rope F that is connected with the loop E, and the upper part of the loop is drawn back until the strap $c$ will throw up the plate $d$, thereby allowing the fork to turn down by its gravity in connection with that of the hay, so that the latter will be discharged therefrom.

By this improvement hay may be elevated and discharged from the fork within a comparatively small place, for the fork being allowed to drop in order to discharge its load the tilting of the handle, as in ordinary forks for the same purpose, is dispensed with. The handle, being necessarily long, cannot be tilted in low mows or within shed-windows, and consequently the use of the usual implement is very much restricted. By our improvement this difficulty is obviated, and the manipulation of the improvement rendered far less laborious and more ready of execution than the ordinary fork in use.

We are aware that various forms of self-discharging forks have been invented; but all of them, so far as I know, have projecting cross-arms and other incumbrances attached. The instrument is thus rendered susceptible of use for one purpose only, to wit, the hoisting of loads. They cannot be applied or used in common hand-work. The incumbrances before described are also highly objectionable, because they render the instrument cumbersome and liable to breakage by catching and swinging against the adjoining posts, &c., in the act of elevation. The load is also liable to be discharged at the wrong point by contact of the projecting arms with any surrounding object; but in our improvement it will be observed that no projecting arms are used; that the instrument as a whole is very compact, resembles the common fork in appearance, is applicable to all the uses and functions of the ordinary article, but may be employed for hoisting and discharging loads whenever required.

Having thus described our invention, what we claim as new, and desire to secure by Letters Patent, is—

The arrangement and combination, substantially as herein shown and described, of the head B, joint C, strap c, plate d, loop E, and cord or wire F, whereby all projecting arms are dispensed with, so that the instrument when not required for hoisting purposes may be used as a common fork.

CHALES E. GLADDING.
J. N. GLADDING.

Witnesses:
ALBERT H. TAYLOR,
P. RANDOLPH MCKEAN.